Jan. 23, 1934. W. L. CLOUSE 1,944,653
NUT PLACER FOR TAPPERS
Filed Feb. 23, 1932 3 Sheets-Sheet 3
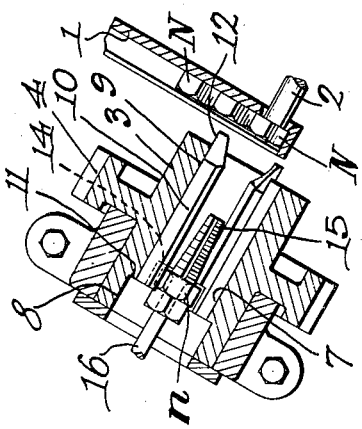
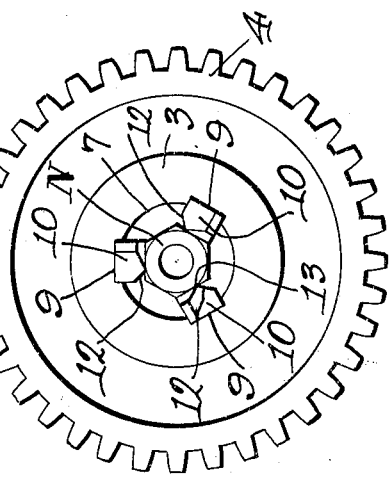
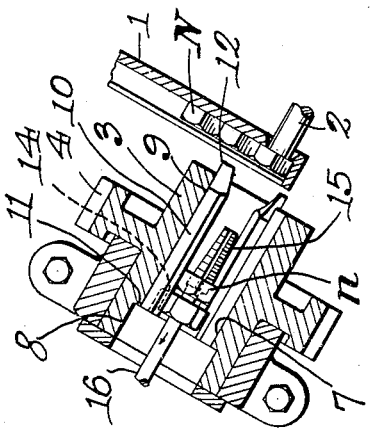
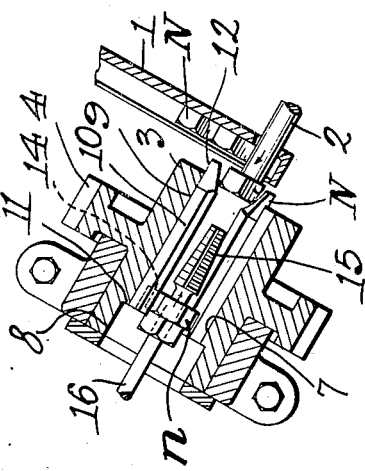
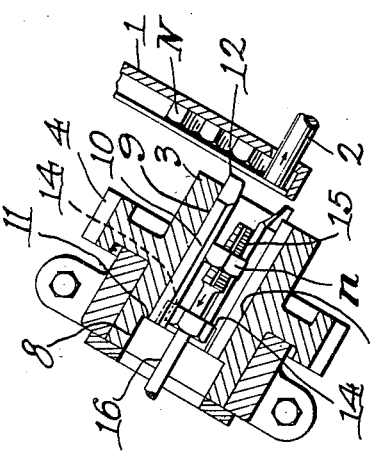
W. L. Clouse Inventor
By C. A. Snow & Co.
Attorneys.

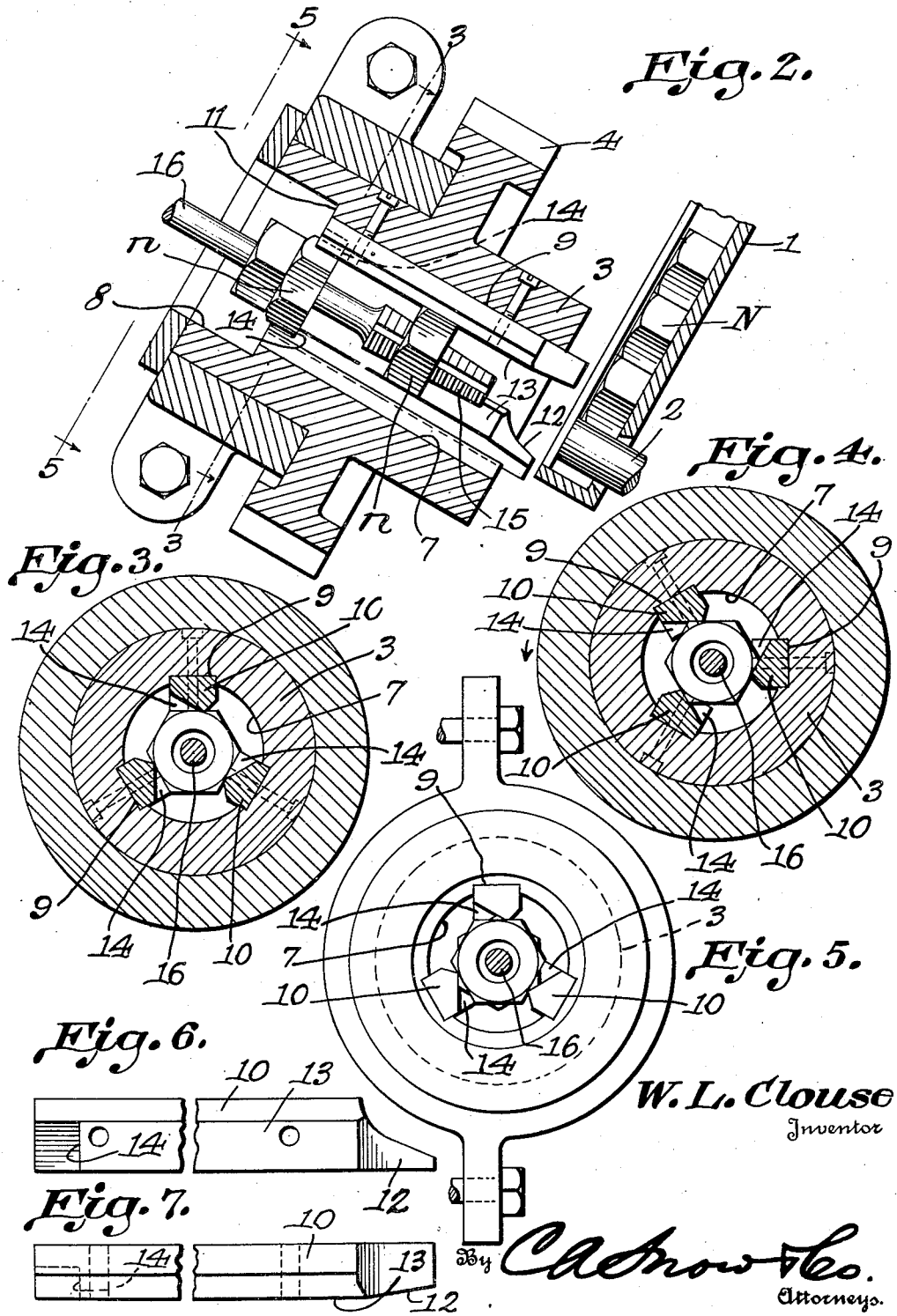

Patented Jan. 23, 1934

1,944,653

UNITED STATES PATENT OFFICE 1,944,653

NUT PLACER FOR TAPPERS

William L. Clouse, Tiffin, Ohio, assignor to The National Machinery Company, Tiffin, Ohio Application February 23, 1932. Serial No. 594,659

18 Claims. (Cl. 10—129)

This invention relates to machines for tapping nuts and more especially to means for properly positioning the nuts as they are fed to the tap and also after the tapping operation has been completed.

It is the practice in some nut tapping machines, such as disclosed in part in my co-pending application, Serial Number 494,785, filed November 10, 1930, to feed the nut blanks successively to a tap which is supported within a rapidly rotating nut holder or chuck. As the threading of a blank is completed the nut is moved back onto the stem of the tap where it forms one of a series which travels along the stem, the nuts being delivered therefrom successively.

To insure correct operation of the machine it is essential that some means be provided for guiding the nuts into proper engagement with the nut holder or chuck so that there will be no choking and consequent retardation of action. It has been especially difficult to place hexagonal nuts in a rotating chuck prior to their engagement with the non-rotatable tap. Difficulty has likewise been experienced after the tapping operation in placing the nuts properly on the reciprocating table from which the tap extends. As the threaded nuts leave the head of the tap and move onto the tap stem they are supported at various angles so that their corners rarely aline. Consequently additional means are desirable to insure placing each of the nuts with one of its flat faces on the supporting surface of the table as said table advances the tap to its blank engaging position.

It has been found also that the series of threaded nuts which accumulates on the tap tends to press against the nuts as they pass off the tap head so that they do not promptly clear the head but are caused to bear thereagainst with the result that the end of the thread in the completed nut is frequently mutilated or distorted.

It is an object of the present invention to improve upon nut tapping machines by mounting the tap between two placers one of which properly guides the blanks to the rotating holder while the other is engaged by the nuts as they move from the holder and places them properly on the tap carrying table where each will be supported with one of its flat faces lowermost so as to slide smoothly and easily over the supporting surface of the table and along the stem of the tap to the point of delivery.

A further object is to provide a simple and efficient means for holding back the series of threaded nuts so that they will not advance with the head of the tap but will be kept clear thereof, thereby allowing each blank, as it is threaded, to pass off the tap head without meeting the usual resistance offered by the previously threaded nuts.

A further object is to provide a hold-back means for the nuts which does not add to or complicate the mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings:

Figure 2 is an enlarged section through the nut holder showing the second stage of the tapping operation.

Figure 3 is a section on line 3—3, Figure 2, showing the nut in position between the placer strips.

Figure 4 is a view similar to Figure 3 but showing the nut seated on the shoulders of the placer strips.

Figure 5 is a section on line 5—5, Figure 2.

Figure 6 is a side elevation of one of the placer strips.

Figure 7 is an elevation of the placer strip viewed at right angles to Figure 6.

Figures 8, 9, 10 and 11 are views showing successive stages of the tapping operation.

Figure 12 is an end view of the nut holder showing the front placer.

Figure 1:
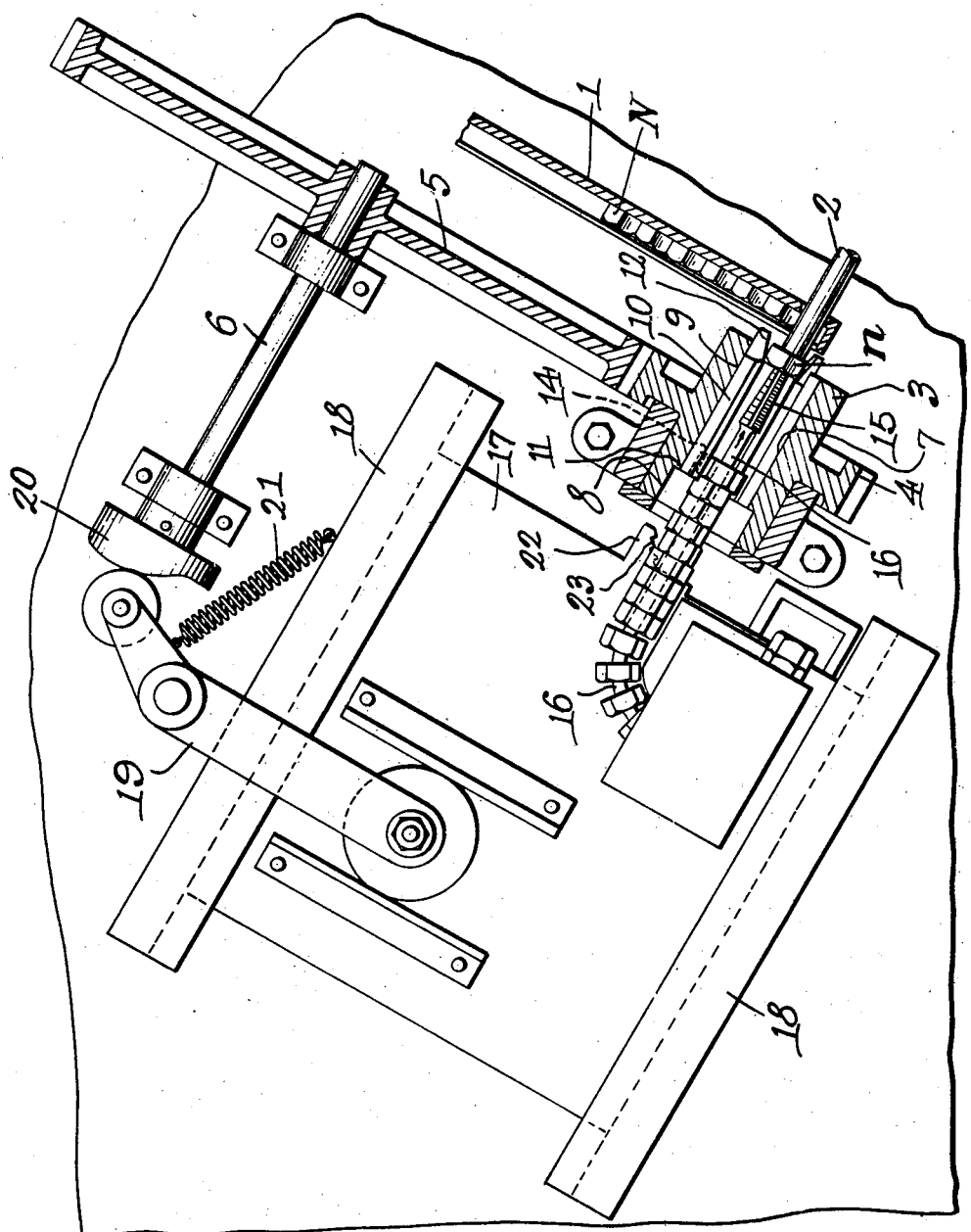
Figure 1 is a view partly in plan and partly in section of a portion of a tapping machine showing the present improvements, the tap and blank being shown in their first stage of a cycle of operations.

Referring to the figures by characters of reference, 1 designates a feed chute to which blanks N are supplied by any desired means so that they will gravitate successively to position between a feed plunger 2 and a nut holder 3. The holder is in the form of a sleeve adapted to be rotated by mechanism of any preferred construction. For example, a gear 4 can be carried by the sleeve so as to be actuated continuously by another gear 5 secured to a power driven shaft 6. The sleeve or holder 3 has a bore 7, preferably cylindrical, the outlet or back end of which can be counterbored as at 8. Longitudinal grooves 9 are formed in the wall of the bore to receive nut guides or placer strips 10 the back ends of which are flush with the shoulder 11 at the inner end of the counterbore while the front ends thereof project from the inlet end of the holder toward the chute 1. The projecting ends diverge outwardly from the sleeve and are also beveled transversely as indicated at 12 so as to constitute deflectors whereby, should a corner of a nut be engaged by any one of the deflectors, said nut would be rotated slightly about its axis until brought into position to fit properly between the flat longitudinal faces 13 of the strips 10 which are arranged to engage alternate flat faces of a blank.

Each of the guide strips 10 is provided with a shoulder 14 near the back end thereof on which a corner portion of a nut can rest after the threading operation has been completed.

This shoulder is preferably provided with a wall extending outwardly from the plane of the nut engaging surface of its guide or placer strip thereby to constitute a stop for the corner portion of a nut to limit its rotation on the stem of a tap as hereinafter explained.

The head 15 of a tap is supported within the nut holder 3 and its stem 16 is extended rearwardly from the holder where it is supported by any suitable means as a table 17. This table is mounted for reciprocation on guides 18 and can be actuated in one direction by a lever 19 receiving motion from a cam 20 driven by shaft 6. A spring 21 can be used for moving the table in the opposite direction.

Adjacent to the point where the tap stem extends from the table there is provided a placer 22 in the form of a tongue having stepped shoulders or projections 23 arranged where they will engage the corners of the nuts if not properly positioned, so as to bring the nuts into line along their corners and guide them properly onto the table.

The plunger 2 and table 17 are adapted to operate in timed relation so that as the table and the tap carried thereby complete their forward movement the plunger will press a nut blank N into the revolving holder 3 and onto the tap. Should a corner of the blank be thrust against the end of one of the placer strips during this operation said blank would be rotated to properly enter the holder and slidably engage the flat inner faces 13 of the strips.

As soon as the head of the tap begins to bite into the blank at the commencement of the threading operation the plunger 2 returns to its initial position preparatory to feeding another blank. As the blank in the holder rotates therewith it will travel along the head of the tap and at the same time the tap will gradually recede as the table moves rearwardly away from the holder. The parts thus will successively assume the positions shown in Figures 2 or 8 and 9. Finally the completely threaded nut will pass off the head 15 just prior to contact of said nut with the previously threaded nut and thereafter the nut $n$ which has moved from the position shown in Figures 8 and 9 and becomes loosely seated on stem 16, will be thrust back by head 15 during the last portion of its rearward movement, thereby sliding all of the completed nuts along the stem. As nut $n$ is loose on the stem it will tend to rotate slightly as soon as it passes the shoulders as shown in Figure 3. Consequently when the table and taps begin their next forward movement this nut $n$ will be held back by one or more of the shoulders so that the tap head can advance as in Figure 11 without being followed by all of the threaded nuts.

While the series of nuts is being held back by shoulder 14 during the movement of the tap and table 17 in one direction, the placer 22 will be engaged by and shift the nearest nut annularly so that the nut will be brought into alinement with the other nuts in advance thereof and rest flat on the surface provided therefor. As pressure due to contact of the placer with the adjacent nut will be transmitted through the series of nuts on the stem 16 directly to the shoulder 14 during this operation, the nut last threaded will not be forced against the head of the tap as heretofore and, consequently there will be no mutilation of the thread.

Although the present improvements have been shown applied to a structure wherein the tap is held against rotation and the nut holder is rotatably mounted it is understood that they can be embodied in the usual form of machine in which the tap rotates in a non-rotatable holder.

What is claimed is:

1. A tapping machine including a rotatable nut holding element, placers extending therefrom, means for feeding a blank thereagainst, a tap element, a second placer adjacent thereto, and means for moving one of said elements to engage a blank with the tap element and for retracting the said element and the engaged blank to force a finished nut against the second placer.

2. A tapping machine including a tap element having a head and a stem for receiving threaded nuts from the head, a nut holding element extending therearound, means for reciprocating one of the elements axially of the other element, means for rotating one of said elements, and means in the holder element for preventing threaded nuts on the stem from advancing with the tap element during successive threading operations thereby to maintain the threaded nuts spaced from the nut being threaded.

3. A tapping machine including a tap element having a stem, a nut holding element extending therearound, nut engaging means carried by the holding element for preventing nuts from moving in one direction with the tap, and separate means for rotating one of said elements and reciprocating the tap element, said tap element, when moving in one direction constituting means for drawing a blank therewith while the blank is rotating with the rotatable element and at the same time threading the blank and feeding it along the tap in the direction of movement of but faster than the tap, thereby to accelerate placing the blank on the stem of the tap in position for engagement by the said nut engaging means.

4. A tapping machine including a nut holding element, placers extending therefrom, means for feeding a blank thereagainst, a tap element mounted for reciprocation, a second placer adjacent thereto, means for advancing the tap element to engage a blank and for retracting the tap element and the engaged blank to force a finished nut against the second placer, and means for rotating one of said elements.

5. A tapping machine including a tap element, a nut holding element extending therearound, separate means for rotating one of said elements and reciprocating the tap element said elements cooperating to feed the nut in one direction during the threading operation, and means in the holding element for preventing threaded nuts from moving with the tap element in a direction opposite to its direction of feed.

6. A tapping machine including a tap, a nut holder extending therearound, means for rotating the holder and reciprocating the tap, said tap, when moving in one direction constituting means for threading a blank rotating with the holder and drawing it longitudinally of the holder in one direction, and a shoulder in the holder for engaging a nut when released from the tap to hold the nut against movement in the opposite direction with the tap.

7. A tapping machine including a rotatable nut holder, means therein for engaging and guiding a nut, a tap head for engaging the nut, means for moving the tap head in one direction in the holder to engage a nut blank and then in the opposite direction to draw the blank along the guiding means during the threading operation, and means in the holder for engagement with the threaded nut when disengaged from the tap head to hold the nut against return movement along the guiding means.

8. A tapping machine including a rotatable nut holder, means therein for engaging and guiding a nut, a tap including a head and a stem, means for advancing the tap within the holder to engage a nut blank held by the guiding means, means for retracting the tap to slide the nut blank along the guiding means during the threading operation, and a shoulder on the guiding means for engaging the nut after it has been threaded and holding it against movement with the tap when advancing in the holder.

9. A tapping machine including a rotatable nut holder, a tap extending thereinto including a head and a stem, a placer adjacent to the tap, means for advancing the tap to engage the tap head with a nut blank to be threaded, said placer constituting means for alining a finished nut when the nut and placer are brought together, and means in the holder for engagement by the last threaded nut of the series to hold the nuts against advance movement with the tap when subjected to thrust produced by the engagement of a nut and the placer.

10. A tapping machine including a rotatable nut holder, a tap extending thereinto including a head and a stem, a placer adjacent to the tap, means for advancing the tap to engage the tap head with a nut blank to be threaded, said placer constituting means for alining a finished nut when the nut and placer are brought together, guides in the holder for the nuts, and a shoulder on each guide constituting means for engagement by the last threaded nut of the series to hold the nuts against advance movement with the tap when one of the nuts is engaged by the placer.

11. A tapping machine including a table mounted for reciprocation, a feeding element, a rotary nut holder between the table and feeding element, a tap movable with the table and supported against rotation in the holder, a nut placer at the feed end of the holder, and a nut placer at the end of the table nearest the nut holder, said feeding element, holder and tap cooperating to direct a nut blank against and past the two placers successively.

12. A tapping machine including a reciprocating tap having a head and a stem for receiving theaded nuts from the head, a rotatable nut holder extending therearound and cooperating therewith to feed a nut in one direction along the tap head while being threaded and thence onto the stem, and means in the holder for preventing movement of threaded nuts on the stem in the opposite direction with the tap during succeeding threading operations.

13. A tapping machine including a reciprocating tap having a head and a stem for receiving threaded nuts from the head, a rotatable nut holder extending therearound and cooperating therewith to feed nuts in one direction along the tap head while being threaded and thence onto the stem, and a shoulder in the holder for preventing movement of the threaded nuts in the opposite direction with the tap during succeeding operation.

14. A tapping machine including a reciprocating tap, a rotatable nut holder extending therearound and guides in the holder each having a projecting placer at the inlet end of the holder and shoulders in the holder adjacent to its outlet end, said shoulders constituting means for holding nuts against movement with the tap toward the inlet end.

15. A tapping machine including a reciprocating tap, a rotatable nut holder extending therearound, guides in the holder having projecting placers at the inlet end of the holder and shoulders adjacent to the outlet end of said holder and a nut placer movable with the tap.

16. A tapping machine including a nut holder having an inlet end and an outlet end, a tap therein having a stem and mounted for reciprocation, and nut guides in the holder each having a shoulder near one end for engaging threaded nuts on the stem of the tap and supporting them against movement with the tap toward the inlet end of the holder.

17. A tapping machine including a nut holder, having an inlet end and an outlet end, a tap mounted to reciprocate therein, nut guides in the holder, and a shoulder on each guide for engaging threaded nuts on the tap and supporting them against movement with the tap toward the inlet end of the holder, each guide having a wall extending outwardly away from the plane of the nut engaging surface of the guide.

18. A tapping machine including a tap element having a head and a stem for receiving threaded nuts from the head, a nut holding element extending therearound and constantly housing the tap head, means for reciprocating one of the elements axially of the other element, means for rotating one of said elements, and means fixed relative to and carried by one of the elements for preventing threaded nuts on the stem from advancing with the reciprocating element during successive threading operations thereby to maintain the threaded nuts spaced from the nut being threaded.

WILLIAM L. CLOUSE.